(Model.)

F. MYERS.
NAILING MACHINE.

No. 267,244. Patented Nov. 7, 1882.

Witnesses:
W. B. Masson.
E. E. Masson

Inventor
Frederick Myers
T. C. Woodward
atty (Model.)

F. MYERS.
NAILING MACHINE.

No. 267,244.  
5 Sheets—Sheet 2.  
Patented Nov. 7, 1882.

Witnesses  
W. B. Masson  
E. E. Masson

Inventor:  
Frederick Myers  
T. C. Woodward  
atty.

(Model.)
F. MYERS.
NAILING MACHINE.
No. 267,244. Patented Nov. 7, 1882.
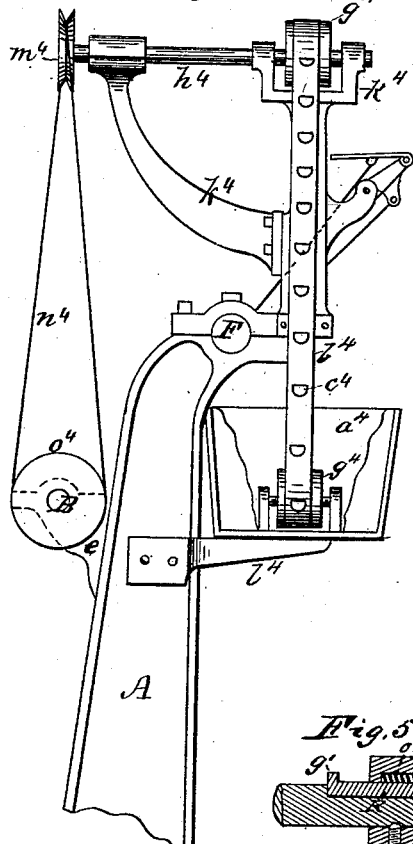
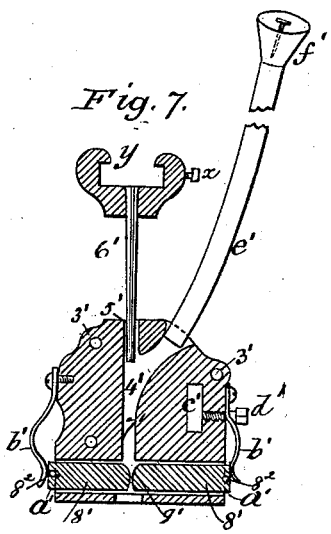
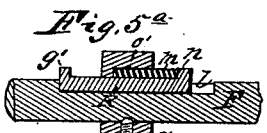
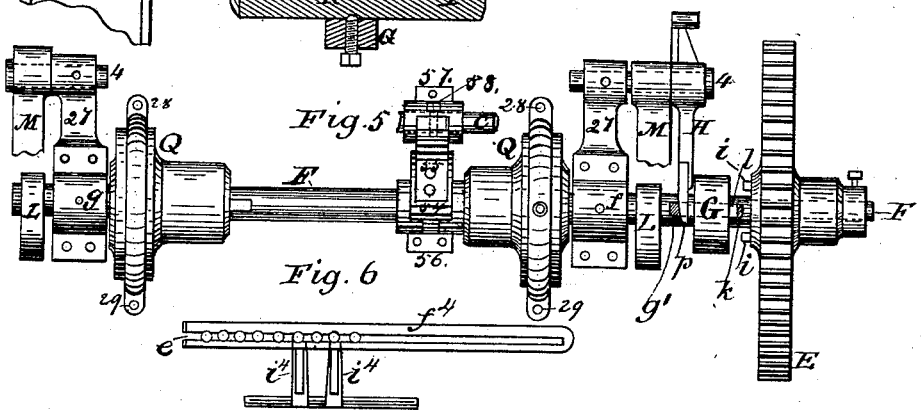
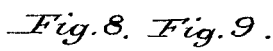
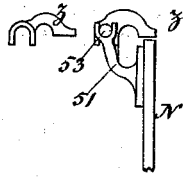
Witnesses:
W. B. Masson.
E. E. Masson
Inventor:
Frederick Myers
T. C. Woodward
atty (Model.)

F. MYERS.
NAILING MACHINE.

No. 267,244. Patented Nov. 7, 1882.

Witnesses:
G. W. B. Masson
E. E. Masson

Inventor:
Frederick Myers
T. C. Woodward
atty.

(Model.)
F. MYERS.
NAILING MACHINE.
No. 267,244.  5 Sheets—Sheet 5.
Patented Nov. 7, 1882.
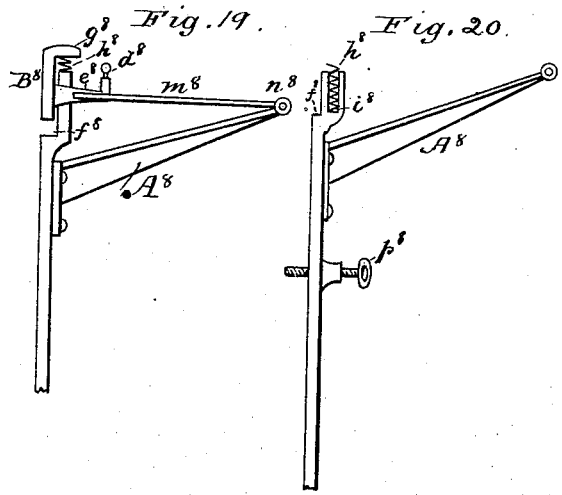
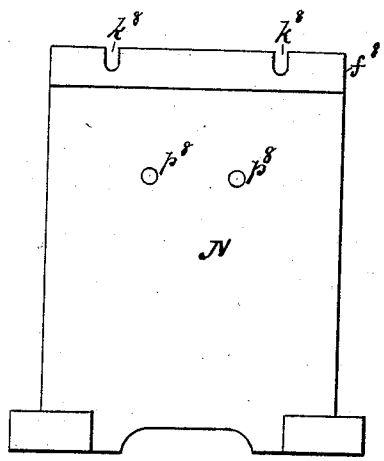
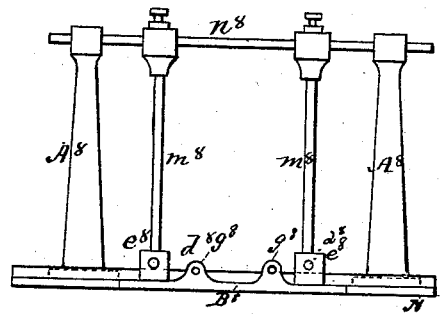
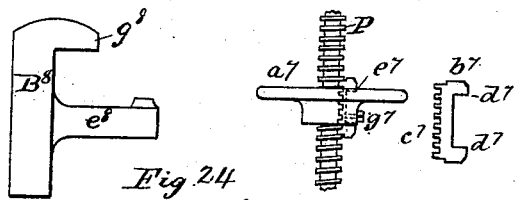
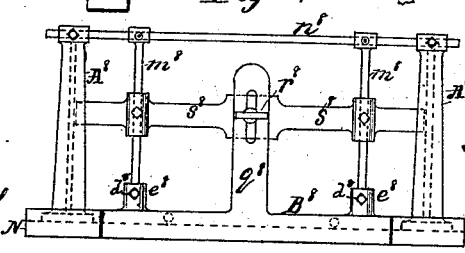
Witnesses:
W. B. Masson.
E. E. Masson.
Inventor
Frederick Myers
T. C. Woodward
atty.

UNITED STATES PATENT OFFICE.

FREDERICK MYERS, OF NEW YORK, N. Y.

NAILING-MACHINE.

SPECIFICATION forming part of Letters Patent No. 267,244, dated November 7, 1882.

Application filed May 27, 1881. (Model.) Patented in England September 1, 1880, No. 3,555; in France March 1, 1881, No. 141,455; in Belgium March 22, 1881, No. 54,181; in Germany March 29, 1881, No. 17,665; in Austria June 4, 1881, and in Spain August 12, 1881, No. 664.

*To all whom it may concern:*

Be it known that I, FREDERICK MYERS, of New York city, New York, have invented new and useful Improvements in Nailing-Machines, of which the following is a specification.

My invention consists essentially of the combination, with reciprocating nail-drivers and stationary nail-boxes, of a back plate on which the work-holding table is mounted, that is caused to rise and firmly press and hold the work against the nail-boxes while the drivers perform the work, and mechanism, substantially as hereinafter described, for operating the nail-drivers, back plate, and table.

It also consists of the table fixed upon said back plate by a cushion which resists the action of the nail-drivers, but varies to accommodate unequal thicknesses of the box material, so as to prevent crushing the same and damage to the machine.

It also consists of a stop device at the top of the back plate to prevent the side boards of the boxes from being shoved in too far over the end boards and the top of said back plate when the table is lowered for the application of the work; and it also consists of certain details hereinafter described.

Figure 1:
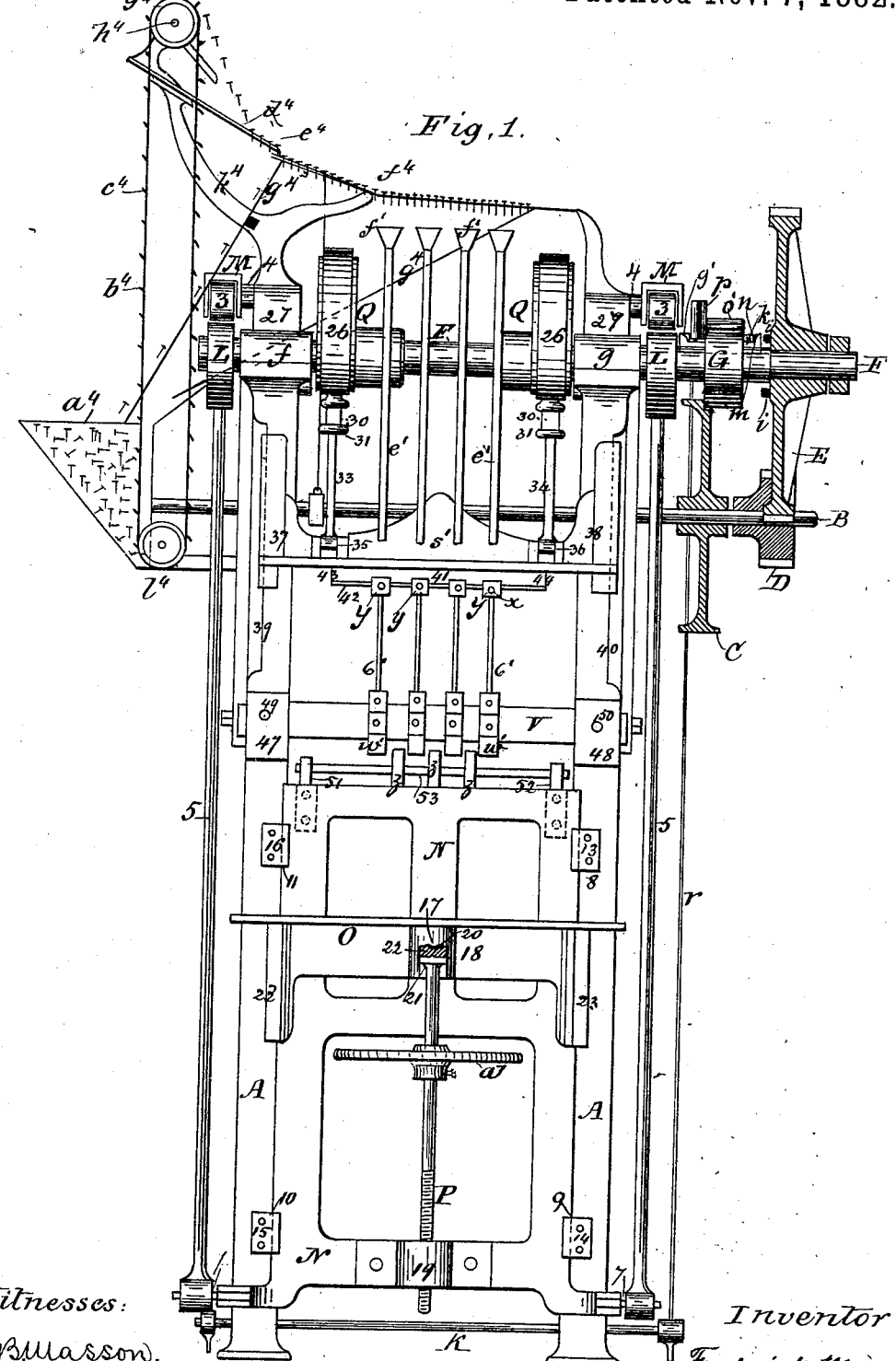
Figure 2:
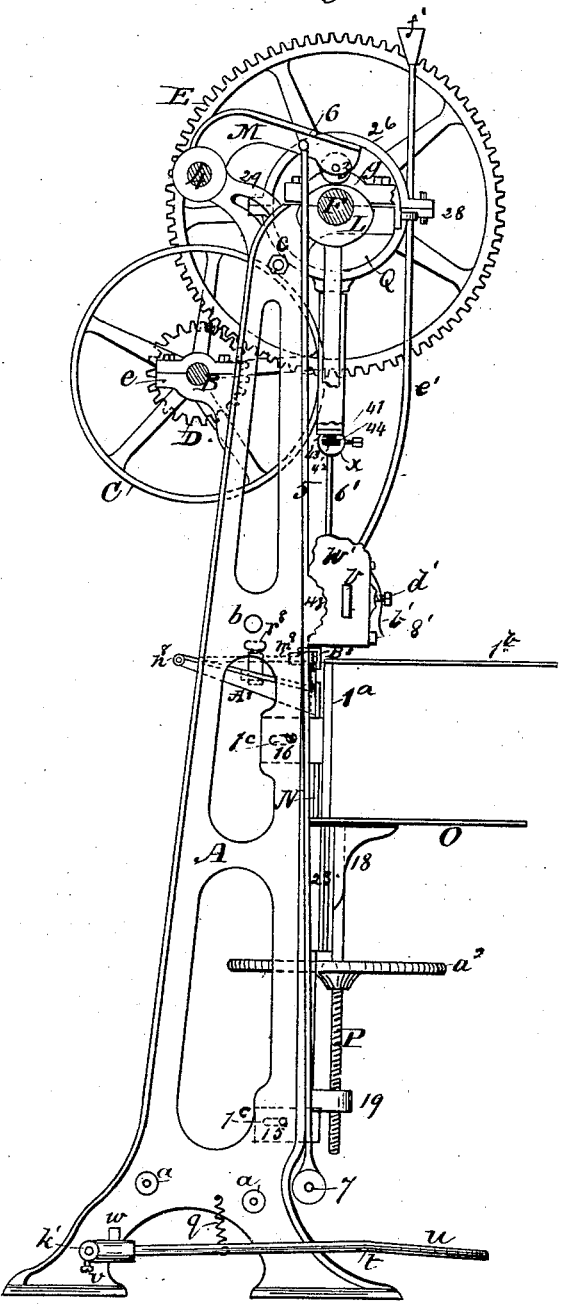
Figure 3:
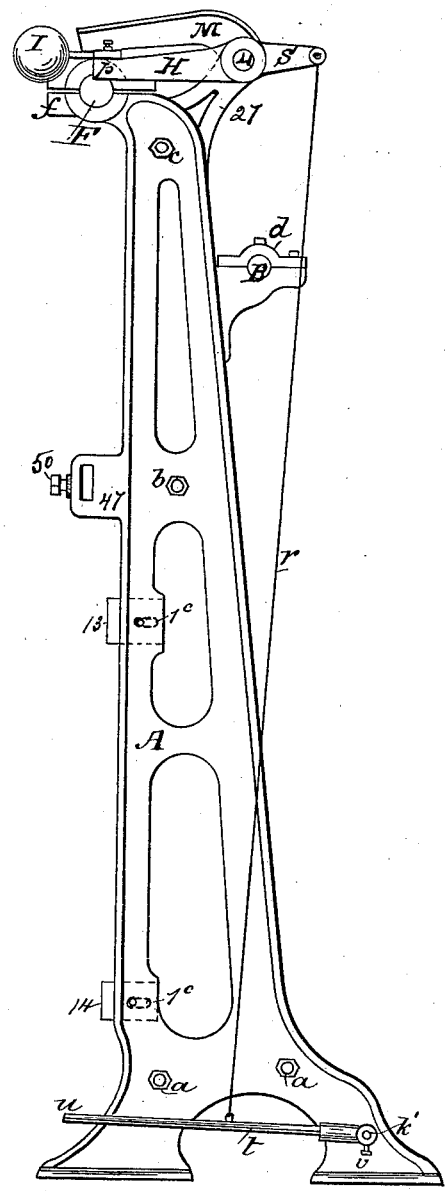
Figure 11:
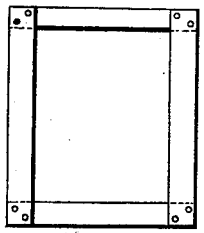
Figure 10:
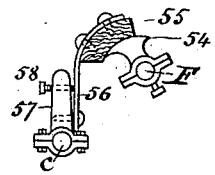
Figure 14:
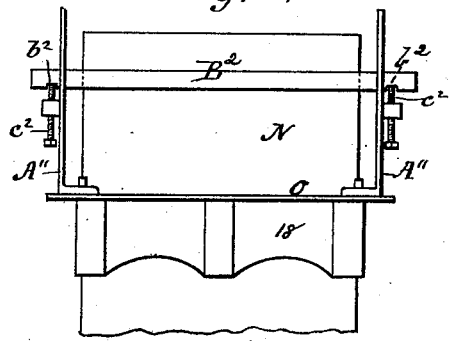
Figure 15:
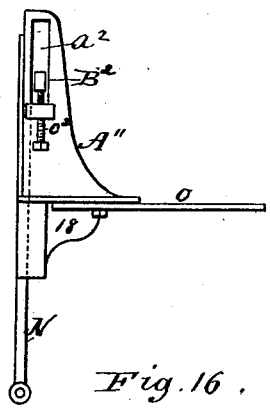
Figure 12:
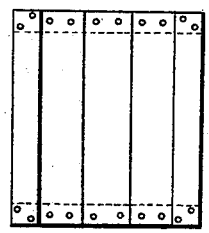
Figure 13:
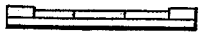
Figure 17:
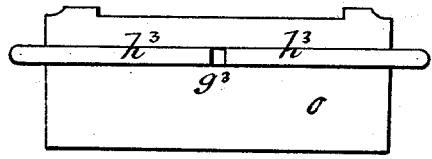
Figure 16:
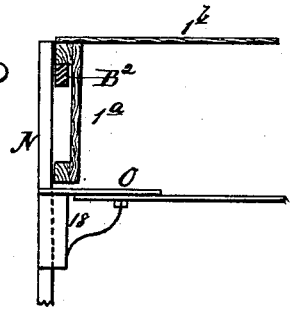
Figure 18:
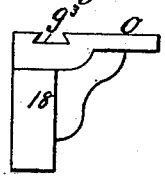

Figure 1 is a front elevation of my improved machine, partly in section, and with a nail-feeder attached. Fig. 2 is a side elevation of the same without the nail-feeder, and showing a bracket for supporting the bar, on which the nail-boxes are fixed, broken off. Fig. 3 is an elevation of the reverse with some of the parts detached. Fig. 4 is a side view of a portion of the machine with the nail-feeder attached. Fig. 5 is a top view of a portion of the machine as represented in Fig. 1. Fig. 5ª is a detail of the clutch for starting and stopping the machine. Fig. 6 is a top view of a portion of the nail-feeder. Fig. 7 is a vertical transverse section of the nail-box, nail-tube, and nail-driver. Fig. 8 is a side view of guard-fingers to prevent the side boards from being inserted under the nail-boxes too far, said fingers being here shown detached from the machine. They are also shown in Fig. 1. Fig. 9 is a side view of the back plate, the aforesaid fingers, and supporting-arm therefor. Fig. 10 is a side view of a brake to control the descent of the nail-drivers. It is also shown in Fig. 5. Fig. 11 is a plan view of the frame of a "made-up" box end. Fig. 12 is a plan view of the box end complete, of which said frame, Fig. 11, forms a part. Fig. 13 is an edge view of the same. Fig. 14 is a front view of a portion of the machine, showing the attachments for supporting the end pieces of the frames of made-up box ends. Fig. 15 is a side view of the same. Fig. 16 is a vertical middle section of the same with a made-up box-end piece on the bar and a box-side piece on the end piece ready for nailing. Fig. 17 is a plan of the table with a removable slide for allowing nails to escape when not driven into the boxes, and for clinching the nails when making the box-end frames of Fig. 11. Fig. 18 is a side view of the table with the slides removed. Figs. 19 and 20 are side elevations. Fig. 21 is a front elevation; Figs. 22 and 23, top views; and Fig. 24, a detail of the back plate, with attachments differing from those of Figs. 8 and 9, and which I prefer to use to prevent the side boards of the boxes from being shoved in too far under the nail-boxes and over the top of the back plate when the latter is lowered. Fig. 25 is a detail of the table-adjusting device.

In the drawings Figs. 1, 2, 3, and 4, A represents the side frames of the machine, held together by the rods *a b c*. The driving-shaft B is supported in bearings *d e* on said frames, and carries the driving-pulley C, to which motion is imparted by a belt from a counter-shaft, and on which is a pinion, D, which works in the spur-wheel E on the end of the main shaft F, supported in bearings *f g* on the top of the side frames. The spur-wheel E is loose on the main shaft, and has studs *i* projecting inwardly from its hub to engage with a gib, *k*, sliding in a groove, *l*, in the main shaft, and secured in position by a hub, G, firmly fixed on the shaft, and also having a groove corresponding with said groove *l* in the shaft. The gib is forced between the studs *i* on the hub of the spur-wheel by a spring, *m*, in a socket, *o*, in the hub G, and bearing against the projection *n* on the gib. The gib is disengaged from the studs *i* by the beveled end *p* of the lever H being forced by the weight I between the projection $g'$ on the end of the gib and the hub G. As the main shaft revolves the beveled end of the lever wedges the gib back and disengages it from the stud $i$, and thereby stops the motion of the main shaft. By raising the beveled end of the lever from between the projection on the end of the gib and the hub—that is, disengaging the clutch—the gib is again forced between the studs $i$ on the hub of the spur-wheel by the spring $m$, and motion is again communicated to the main shaft. The object of the clutch is to enable the machine to be stopped readily after each operation while the operator removes the nailed box and applies another; and in order that the machine shall positively stop at the right time and in the right position the gib $k$ and the beveled lever are so arranged that the latter stops the driving-shaft by wedging between head $g$ and collar G, and the said lever and gib are also so arranged with relation to the nail-driver and work-table connecting and operating devices that the nail-drivers are stopped in the highest position and the work-table in the lowest. (See Fig. 1.) The beveled end of the lever is raised by a treadle consisting of a rod, $r$, extending from the arm S of the said lever to the foot-rod $t$, bent, as shown, to pass around the frame and form a foot-piece, $u$, and held by set-screws $v$ and $w$ to projecting arms of the rod $k'$, having bearings in the foot of the side frames. By pressing the foot upon the foot-piece $u$ the rod $r$, and consequently the arm S of the lever, is drawn down, and the beveled end of the lever is disengaged from the gib $k$, when by the force of the spring $m$ the gib is again engaged with the studs $i$, and when the foot is removed from the foot-piece the force of the spring $q$, attached to the side of the frame and to the foot-piece, assists the weight I to raise the foot-piece to its first position, and to engage the beveled end of the lever with the gib.

The cams L on the main shaft turn against rollers 3, running free in the ends of the levers M, which levers have for their fulcrums studs 4, projecting from brackets of the side frames, A. Between the rollers 3 and the studs 4 the rods 5 are pivoted to said levers at 6, which rods are connected at their lower ends to studs 7 in the bottom of the back plate, N, for operating it, said plate being for supporting and operating the work-holding table O; and for gaging the work under the nail-drivers to center the nails in the box-end pieces it slides in grooves 8 9 10 11 in blocks 13, 14, 15, and 16, bolted to the side frames. These blocks in which the back plate slides are provided with slotted holes for the fastening-bolts $1^c$, Fig. 2, by which it may be shifted forward and backward under the nail drivers, according to the thickness of the end boards, $1^a$, to be nailed.

The table O, which is for holding the box to be nailed and pressing it up and confining it against the nail-boxes, is supported on the back plate, N, by an adjusting-screw, P, and by grooved guides 23, working on the edges of the back plate, to permit the table to slide on the back plate for adjustment to different sizes of boxes, and when yielding to the pressure of clamping the boxes to be nailed under the nail-boxes, for which it is cushioned on the top of the adjusting-screw by a rubber or other spring, 22, between washers 20 and 21, so that boxes varying a little in the thickness of the sides being nailed on the ends will be clamped alike, whereas if the table were unyielding the boxes with thick sides would be crushed or those with thin sides would not be firmly secured. The back plate and table are raised simultaneously with or a little in advance of the descent of the nail-drivers to press the work to be nailed firmly against the nail-boxes W' and hold it firmly while being nailed, and lowered when the nail-drivers ascend to permit the parts of the boxes—as end pieces, $1^a$, and side pieces, $1^b$—to be easily admitted and removed from the machine; and the table is shifted by the adjusting-screw to allow for different lengths of parts of boxes—for example, less space, equal to the thickness of a side piece, $1^b$, is required in nailing on the first side than in nailing on the second side.

For operating the nail-drivers two eccentrics, Q, are keyed on the main shaft, and the straps 26, which are bolted around them at 28 and 29, Figs. 2 and 5, are connected by screws and jam-nuts 30 and 31, Fig. 1, to rods 33 and 34, that are connected by stud-pins 35 and 36 to the cross-head S', having grooves 37 and 38, and sliding on rails 39 and 40, bolted to the side frames, A. On the under side of the cross-head is a downward-projecting strip, 41, to which is bolted a somewhat wider bar, 42, both constituting an inverted-T bar to form the ledges 43 and 44 for the support of the plungers or nail-drivers 6', which have heads $y$, with T-shaped notches or grooves in the top, adapted to slide on the ledges and support the plungers on said bar, whereon they are adjustable, and have set-screws X to secure them.

The nail-boxes W' are supported on the bar V, that is supported in the brackets 47 and 48 of the side frames, and fastened by set-screws 49 and 50. The nail-boxes are made in two parts, Q', (see Fig. 7,) and held together by screws 3', each part having a curved groove, 4', flared at its outer end, together forming a round channel to receive the nails, and in each part there is also a straight groove, 5', together forming a channel to receive the plungers or nail-drivers 6'. These two channels unite and form one channel, 7', to conduct the nails to the hardened-steel guides 8', which are shaped on their inner ends to form cup-like receptacles for the ends of the nails. These nail-guides are fitted in grooves $a'$ in the two parts of the nail-box, and are kept in position by springs $b'$ $b'$, screwed on the front and back of the nail-box. The guides have stop-pins or studs $8^2$, which by contact with the sides of the box prevent the inner ends from meeting either side of the channel 7', as they would be liable to do on account of one spring having more power than the other. The nail-boxes are applied to the bar V by passing it through an oblong slot, $c'$, in them, and they are fastened in any desired position by set-screws $d'$, so that they can be adjusted for driving nails at any desired distance apart. The nail-drivers, which should be made of steel rods, should always be entered within channels $5'$, and not be permitted to rise out of them, their function being to guide the drivers onto the nails below, the nails being dropped in below them through the curved channel $4'$, to which they are conducted by feeding-tubes $e'$, having a funnel-mouth, $f'$, into which they may be supplied either by hand or by a feeder; but I reserve these improvements in nail-boxes for a separate application for a patent thereon.

In order to allow the hand-wheel $a^7$ to shift along the screw, to allow the latter to shift more than the back plate will allow the wheel to shift, and to provide a contrivance allowing it to be shifted readily, said wheel is fitted on the screw with threads corresponding with the threads of the screw, and lugs $d^7$ to hold the gib in place in a slot, $e^7$, in the hub of the hand-wheel. (See Fig. 25.) The gib is put in place when the hand-wheel is off the screw, and with the hand-wheel is screwed onto the screw. The wheel is set at any point on the screw for turning it by the gib and a set-screw, $g^7$, and it is shifted up or down thereon by loosening the set-screw and screwing the hand-wheel up or down on the screw, thus allowing the raising and lowering of the table in a wider range than the hand-wheel has room for, to suit small or large work, as in nailing together thin end pieces, small boxes, or large boxes.

The stop device at the top of the back plate, to prevent the side boards, $1^b$, of the boxes from being shoved in too far on the end boards, $1^a$, and over the top of the back plate when the table is lowered, and thereby being crushed under the nail-boxes when the table rises, may consist of the fingers $z$, supported on rod 53, carried in arms 51 and 52, projecting from the back plate, the front ends of the fingers resting on the top of the back plate between the nail-boxes, and rising and falling with it, as represented in detail in Figs. 8 and 9, and in application to the machine in Fig. 1. I prefer, however, to employ for this purpose the arrangement shown in detail in Figs. 19, 20, 21, 22, 23, and 24, and in application to the machine in Fig. 2, which said arrangement consists of brackets $A^8$, projecting backward from the back plate and supporting a shaft, $n^8$, which supports rods $m^8$, that are connected by set-screws $d^8$ to sleeves $e^8$, and support a plate or plates, $B^8$, to which the sleeves are firmly fixed. The rods $m^8$ are adjustable on the shaft $n^8$ by set-screws or otherwise. The back plate has in this case an offset backward at $f^8$, in which the plate or plates $B^8$ are located, said plates having a top flange or lugs, $g^8$, overhanging the top of the offset part of the back plate for the application of springs $h^8$ under them, and resting in sockets $i^8$ in the top of the back plate to keep them always pressed up against the bottoms of the nail-boxes, and thus prevent the boards from being passed in too far. By preference only one plate $B^8$ will be used, said plate extending along all the nail-boxes; but it may be made in two or more sections, if desired. To adjust this back plate, $B^8$, for end boards of different thicknesses it is shifted forward or backward on the rods $m^8$ by the sockets $e^8$ and set-screws $d^8$. These sockets $e^8$ rest in notches $k^8$ in the top of back plate, N. As the springs $h^8$ will press the plate $B^8$ up against the nail-boxes, so as to interfere with shifting said boxes readily along the bar V, (which is frequently required to adjust them for boxes of different sizes to be nailed,) it will be provided with a slotted arm, $q^8$, clamp-screw $r^8$, and clamp-bar $s^8$, the latter being attached to arms $A^8$, and the screw being screwed into it through the slotted arm $q^8$, so that the nail-boxes may at any time be readily freed from the pressure of said springs by turning the clamp-screw, which will hold plate $B^8$ free from the nail-boxes until they are adjusted, when said plate may again be allowed to press against them by turning the screw back.

The screws $p^8$ in the back plate are for use in connection with plate $B^8$ to adjust the end boards for rightly receiving the nails. When these devices are used the back plate itself will not be shifted by its guide-blocks 13, 14, 15, and 16, except when end boards of greater than usual differences in thickness are used.

To prevent the too sudden downward movement of the heavy cross-head $s'$ and eccentric-rods by which the nail-drivers are operated, a brake-arm, 54, Figs. 5 and 10, is placed on the main shaft F to operate against a wood block, 55, attached to an adjustable spring, 56, bolted to the rigid arm 57, supported on tie-rod $c$, connecting the side frames. The spring is adjustable by the screw 58 to regulate the action of the brake. When the eccentrics are passing their upper centers, as the main shaft revolves, the brake commences to act, and prevents a sudden downward movement of the cross-head and consequent jarring of the machine in case the journal-boxes of the machine become loose. A counterbalance-weight mounted on the shaft by an arm suitably located may be used instead of the brake.

To nail up boxes the operator places an end piece, $1^a$, of a box upright against the back plate under the nail-drivers and nail-boxes, and places one end of a side piece, $1^b$, on the upper edge of the end piece and against stop $z$ or $B^8$. He then presses his foot on and instantly removes it from the foot-piece $n$ of the treadle, which draws down the rear end, S, of lever H, and raises the front beveled end from between the hub G and the lug $g'$ of the gib $k$. The gib is then instantly forced by the spring $m$ to engage with the studs $i$ on the hub of the spur-wheel, which causes motion to be communicated to the main shaft and eccentrics, and consequently to the cross-head and the nail-drivers. It also causes the back plate and table to rise by cams L, levers M, and rods 5 to press the parts of the box to be nailed up against the nail-boxes and hold them securely while being nailed, this movement taking place slightly in advance of the descent of the nail-drivers. The nails, having been previously supplied to the funnels $f'$ by hand or otherwise, rest on their points in the cup-like receptacles in the nail-guides, so that by the descent of the drivers they are forced through the side board, $1^b$, into the end board, $1^a$, nailing them together. When motion is communicated to the main shaft as above described, and the pressure instantly removed from the foot-treadle, it makes one revolution, when the spring $q$ raises the treadle, and consequently, by the rod $r$, raises the rear end, S, of the lever H, and forces the beveled end $p$ of the lever between the projection $g'$ on the gib and the hub G, and thereby, as the shaft and gib revolve, disengages the gib from the studs on the hub of the spur-wheel, stops the main shaft, allowing it to remain motionless. Then the nail-drivers are up and the table down, ready for adjusting the parts of the box for the next operation, which consists of nailing the other end of the side board, $1^b$, to another end board, $1^a$. If the other side board is then to be nailed on, the operator will lower the table O by the adjusting-screw the thickness of one side board; but practically another machine will be used for that part of the work to avoid shifting the table for each box; or a number of the first sides and ends will be nailed together first and set aside to be afterward finished together, after the table has been shifted.

Boxes are frequently put together with what are called "made-up" ends, to make them strong. To do this narrow strips of board are used, being nailed together, making a frame of four pieces, Fig. 11. Then thin boards are nailed in this frame to fill up the space, altogether forming the end for a box, Fig. 12. Now, in nailing the sides to these ends with the machines the pressure of the nail-drivers is so great that it crushes the frame or end pieces. To obviate this difficulty I make an attachment consisting of two standards, A'', Figs. 14 and 15, bolted fast to the table O, out far enough at the ends of the table to clear the back plate and its guides, which standards have a long slot, $a^2$, wherein rests a bar, $B^2$, of iron, supported by a screw, $c^2$, so that the bar can be raised or lowered for boxes of different sizes.

Instead of resting the end of the box on the table, as in the case of solid ends, one of the projecting pieces of the frame is rested on the bar, so that the bar prevents the blow from crushing the end, and if there is any variation in the sizes of the ends the table, bar, and all yield by the cushion the same as if the end were placed directly on the end of the table.

The bar has a small notch, $b^2$, to receive the end of the adjusting-screw $c^2$, so that the bar cannot work out of the slot when in use.

In nailing boxes with solid ends the bar is removed; but the standards remain, as they are not in the way.

When making the frames, Fig. 11, the table is adjusted very close to the nail-boxes for clinching the nails, and very often it is necessary to force the nails out of nail-boxes without nailing, in which case they will be wasted, if the table is solid, by bending and crushing against it, unless the operator lowers the table, which will cause too much loss of time. A portion of the table is therefore cut away, Figs. 17 and 18, forming a dovetail slot, $g^3$, in which are fitted plates $h^3$, that can be drawn back from each side, leaving an opening, so that the nails can drop through. The drawings show the slide in two pieces; but it may be made in one.

In Figs. 1 and 4 I have represented a nail-feeder for supplying the nails to the feeding-tubes, consisting of a receptacle, $a^4$, supported on an arm, $l^4$, on the frame of the machine, a carrier, $b^4$ $c^4$, working on drums $g^4$ on shaft $h^4$, supported by $k^4$, bolted to the top of the nailing-machine, and a vibrating incline, $d^4$ $e^4$, for conducting the nails onto the slotted plate $f^4$, from which they may be transferred to said tubes by fingers $i^4$ or other approved means, and also a chute, $g^4$, to transfer any nails that may fail of entering the slotted plate $f^4$, and conducting them back into the receptacle; but I do not confine myself to this particular arrangement of feeding apparatus.

Having thus described my invention, what I claim, and desire to secure by Letters Patent, is—

1. The combination, in a nailing-machine, of reciprocating nail-drivers, stationary nail-boxes, a reciprocating back plate, and a work-holding table located on said back plate, and being cushioned thereon by a spring or yielding support that presses the work against the nail-boxes while the nails are driven, substantially as described.

2. The combination, in a box-nailing machine and with stationary nail-boxes therein, of the driving-shaft F, having clutch and stop mechanism, substantially as described, the nail-driver cross-head and its eccentrics and connecting-rods, the reciprocating back plate and work-holding table located thereon, connecting-rods 5, cam-levers M, and cams L, substantially as described.

3. The combination, in a nailing-machine, of a reciprocating back plate, a work-holding table located on said back plate, stationary nail-boxes, and a back stop, substantially as herein shown and described, on said back plate to gage the work to the nail-drivers, as described.

4. The combination, in a nailing-machine, of stationary nail-boxes, a reciprocating back plate and work-holding table, and a back stop to gage the work to the nail-drivers, that is mounted on the reciprocating back plate and continuously pressed against the nail-boxes, substantially as described.

5. The combination, in a nailing-machine, of stationary nail-boxes, a reciprocating back plate, a back stop mounted on said reciprocating back plate to gage the work to the nail-drivers, springs on said back plate to press said stop against the nail-boxes, and a clamp-screw to retract the springs and suspend such pressure when required, substantially as described.

6. The combination, in a nailing-machine, with the reciprocating back plate and the work-holding table, of a support for frame-pieces of made-up box ends, consisting of brackets A″, removable bar B², and adjusting-screws C², substantially as described.

7. The combination, in a nailing-machine, of reciprocating nail-drivers, a reciprocating back plate, and a work-holding table located on said back plate, and having a removable bar to open said table for the escape of the nails, as described.

8. The combination, in a nailing-machine, of stationary nail-boxes, reciprocating back plate, a work-holding table located and arranged adjustably on said back plate, a screw and hand-wheel for adjusting said table, and a cushion interposed between said table and adjusting-screw to press the work against the nail-boxes while the nails are driven, substantially as described.

9. The combination, in a nailing-machine, of a reciprocating back plate, a work-holding table located on said back plate, a screw for adjusting said table, and a hand-wheel for operating said screw, arranged with a screw-threaded gib and set-screw for being adjustable on the screw, substantially as described.

In witness whereof I have hereunto signed my name in the presence of two subscribing witnesses.

FREDERICK MYERS.

Witnesses:
JOHN DEAN,
G. W. WESTLEY,
*Both of 17 Gracechurch Street, London.*